April 1, 1924.
I. C. WOODWARD
1,488,581
DIFFERENTIAL GEAR
Filed Feb. 21, 1923    2 Sheets-Sheet 1
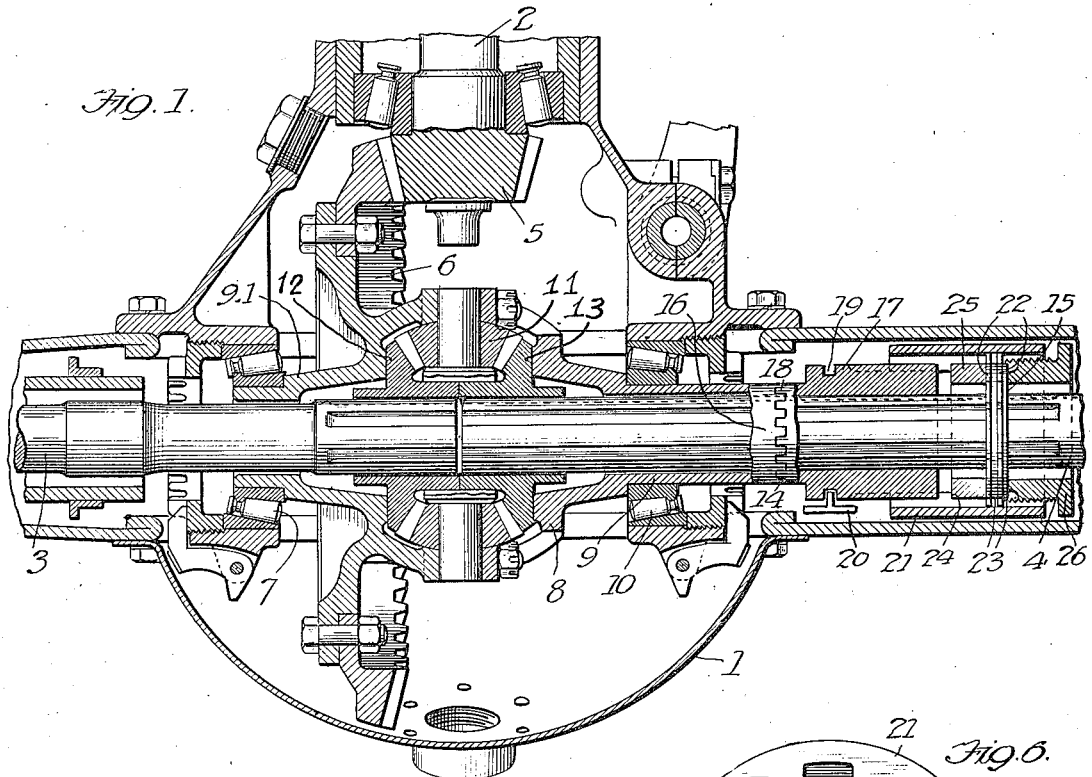
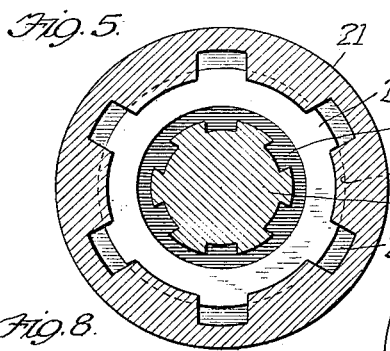
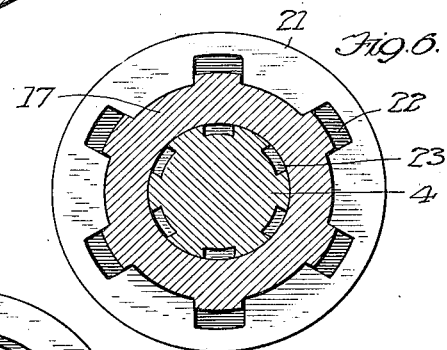
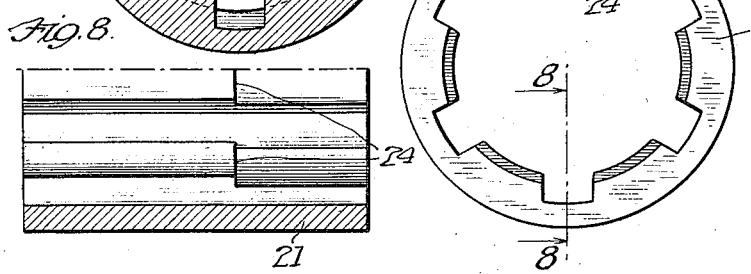

April 1, 1924.

I. C. WOODWARD 1,488,581

DIFFERENTIAL GEAR

Filed Feb. 21, 1923    2 Sheets-Sheet 2

Witness
Martin H. Olsen

Inventor
Irving C. Woodward,
By Rummler & Rummler,
Attys

Patented Apr. 1, 1924.

1,488,581

UNITED STATES PATENT OFFICE.

IRVING C. WOODWARD, OF SYRACUSE, NEW YORK.

DIFFERENTIAL GEAR.

Application filed February 21, 1923. Serial No. 620,335.

*To all whom it may concern:*

Be it known that I, IRVING C. WOODWARD, a citizen of the United States of America, and a resident of Syracuse, county of Onondaga, and State of New York, have invented a new and useful Improvement in Differential Gears, of which the following is a specification.

This invention relates to differential gears of the type employed in vehicle drive mechanisms.

An object of the invention is to improve such gearing so that it is controllable to offer any desired graduated resistance to differential action according to the power of a vehicle and the load which it is intended to carry, and the effort to differentiate between the driven wheels. It is also an object of the invention to provide convenient means for rendering the said control mechanism inoperative, if desired, so that under good road conditions, the differential gearing is made free for differentiating with the minimum of inherent resistance.

Prior to this invention, means have been provided for positively preventing at desired times any differential motion between the elements of the differential gearing, and it is also well-known in the art to provide frictional resistance in the differential gearing to at all times prevent free differential action, or a tendency of one wheel to race if it does not have good traction or rises clear of the road surface. The first of these two prior types of controlling devices is usually in the form of a pair of jawed clutches, one of which is splined to one of the axles, so as to be in driving relation therewith and slidable along the axle to engage the coacting clutch member, which is generally formed in the pinion support or casing of the differential gearing. Such construction, therefore, either positively prevents differential action, or when thrown out, has no restraining effect whatever. The second form of prior device mentioned is usually in the form of friction disks which may be similarly placed as the jaw clutch type, but are always in action, and, therefore, offer a fixed resistance which is overcome by some predetermined effort to differentiate between the driven wheels.

The present invention relates to the above-mentioned friction type of restraining means for differential gears, but is improved so that the frictional resistance may be easily varied to suit different cars, and the mechanism is made controllable so as to readily be placed into or out of action the same as the first-mentioned type of jaw clutch device.

An illustrative embodiment of this invention is shown in the accompanying drawings, wherein—

Figure 1 is a sectional plan view of a differential gearing including a clutch mechanism constructed according to this invention.

Figure 2 is an enlarged central longitudinal section of the clutch mechanism, part of the differential mechanism being shown in elevation.

Figure 3 is a transverse section taken on the line 3—3 of Figure 2.

Figure 4 is a transverse section taken on the line 4—4 of Figure 2.

Figures 5 and 6 are transverse sections taken respectively on the lines 5—5 and 6—6 of Figure 2.

Figure 7 is an end view of the sleeve which connects the jaw clutch with the friction clutch.

Figure 8 is a section taken on the line 8—8 of Figure 7.

It is well-known in this art that vehicle differential gearing which is not provided with means for restraining its differential action is highly efficient under circumstances where the wheels have good traction on a level road, but that under certain circumstances the action of such gearing is dangerous in that it has a tendency to cause one wheel to race if the road is slippery and the brakes are unevenly applied. This results in a turning torque and side slipping of the vehicle. The unrestrained differential gearing also has a bad effect on the mechanism of the car as a whole during fast driving over a rough road, in that when one wheel loses traction by rising more or less from the road surface it speeds up and is then suddenly checked, when it again attains good traction. This has a racking effect on the car which shortens its life. Axles are also frequently broken through the operation of an unrestrained differential gear at times, which results in the entire work of driving the car being effected by one wheel alone.

With the present construction, the frictional resistance is provided for the differential gearing, together with means for varying the amount of this frictional resistance, together with means for rendering it effective or ineffective at the will of the driver of the car.

In the form shown, the differential gearing is arranged within the usual frame structure or housing 1. Power shaft 2, and driven shafts 3 and 4 have their ends supported in the housing 1 by the usual bearings. The driving shaft 2 has a pinion 5, which meshes with a gear 6 secured to a planetary gear housing 8 having a hub 9.1 supported in a bearing 7 of the housing 1 and a hub 9, which is in turn journaled concentrically with the shaft 4 in a ball bearing 10 of the housing 1. A plurality of planetary gears 11 are journaled on stud shafts carried by the housing 8, and mesh with beveled gears 12 and 13 fixed on the shafts 3 and 4, respectively.

The present invention resides in the means for controlling the action of the differential gearing, and in the particular form illustrated comprises a clutch mechanism interposed between the planetary gear housing 8 and the shaft 4, it being understood that the locking of the shaft 4 to the housing 8 has the effect of locking the entire differential gearing, thereby compelling both shafts 3 and 4 to rotate as a unit.

The clutch mechanism includes a jaw clutch and a disk friction clutch arranged so that the friction clutch will yield to permit a relative movement of the driven members, thereby producing differential action, when the jaw clutch is subjected to a predetermined load.

The clutch mechanism comprises a jaw clutch 14 and a multiple disk friction clutch 15, coaxially arranged on the driven shaft 4.

The jaw clutch 14 comprises a pair of elements 16 and 17 having interfitting shoulders 18 on their opposed faces. In the particular construction shown, the clutch element 16 is formed integral with the hub 9 of the planetary gear housing 8. The clutch element 17 is loosely mounted on the shaft 4, so as to be movable axially into and out of driving relation with the clutch element 16. Formed on the periphery of the element 17, is an annular groove 19 to receive an operating arm or lever 20. Splined to the periphery of the clutch element 17 and projecting beyond one end thereof, is a sleeve 21 which is arranged to form a housing for the friction clutch 15. The sleeve 21 and the friction clutch 15 form the connection between the jaw clutch 14 and the driven shaft 4.

As illustrated, the friction clutch 15, comprises a plurality of alternately arranged disks 22 and 23. The disks 22 are loose on the shaft 4 and are splined to the inner wall of the sleeve 21, while the disks 23 are loose in the sleeve 21 and are splined to the shaft 4. Loosely mounted between the end disk 22 and shoulders 24 formed on the splines of the sleeve 21, is an annular bearing member 25 which limits the inward movement of the clutch element 17 and also serves to take up the thrust of the friction disks 22 and 23 under the action of a clamping member 26. The clamping member 26 is in the form of a gland and is threaded to the sleeve 21 so as to be axially adjustable for varying the friction between the disks 22 and 23.

When the clutch elements 16 and 17 are engaged, the friction clutch 15 holds the housing 8 in driving relation with the shaft 4, whereby both of the driven shafts 3 and 4 will be rotated in unison under normal conditions. The operating arm 20 may be actuated and locked, so as to hold the clutch member 17 open, by any of the usual forms of lever and toggle mechanisms.

The operation of the device shown is as follows:—

When the clutch 14 is open, the power is transmitted as usual so that the driven shafts will each receive an equal amount of power when the tractive resistance of the vehicle wheels is equal. When the vehicle is driven in a curve, the wheel traversing the path of lesser radius slows down accordingly, while the wheel traversing the path of greater radius increases its speed as usual, but the power is properly divided between the wheels.

When, however, the pavement is slippery or the vehicle is on a steep grade or when the road is rough so that the vehicle wheels are sometimes lifted clear of the road, the operator may prevent skidding, racing of the engine, loss of traction and other troubles inherent in the usual differential gearing by throwing in the gear locking jaw clutch. If, due to road conditions or the manner of operating the vehicle, one of the driven wheels loses its tractional hold on the road, the clutch mechanism will insure an amount of power up to the limit of the holding power of the friction clutch, to be positively delivered to both driven shafts, but, if the circumstances are such that the strain on the clutch mechanism is sufficient to overcome the holding power of the friction clutch, then the disks 22 and 23 will yield to permit a relative rotation of the shaft 4 and jaw clutch 14, and differential action will take place so as to prevent excessive strain on the gearing.

Although but one specific embodiment of this invention has been herein shown and described, it will be understood that numerous details of the construction shown may be altered or omitted without departing from the spirit of this invention as defined by the following claims:

I claim:

1. A vehicle drive mechanism comprising a driving member and a pair of driven members, differential gearing connecting said driven members, a clutch interposed between two of said members, and a friction element interposed between said clutch and one of said two members, said friction element being arranged to permit a relative movement between the members clutched together when the load on said clutch exceeds a predetermined amount.

2. In a differential gear mechanism including a driving member and a pair of driven members, the combination of a clutch interposed between two of said members, said clutch comprising a pair of elements having coacting parts adapted to be placed into and out of driving relation to each other, and a friction element interposed between said clutch and one of said two members, said friction element being arranged to permit a relative movement of said two members when the load on said clutch exceeds a predetermined amount.

3. In a differential gear mechanism including a driving member and a pair of driven members, the combination of a clutch interposed between two of said members, said clutch comprising a pair of elements having coacting parts adapted to be placed into and out of driving relation to each other, one of said clutch elements being loosely mounted on one of said two members, and a friction element interposed between said one member and said one clutch element for normally holding them in driving relation to each other, said friction element being arranged to permit a relative movement of said two members when the load on said clutch exceeds a predetermined amount.

4. In a differential gear mechanism including a driving member and a pair of driven members, the combination of a clutch interposed between two of said members, said clutch comprising a pair of coacting elements, one of said elements being loosely mounted on one of said two members and being movable into and out of driving relation with the other of said clutch elements, and a friction element interposed between said one member and said one clutch element for normally holding them in driving relation to each other, said friction element being arranged to permit a relative movement of said two members when the load on said clutch exceeds a predetermined amount.

5. In a differential gear mechanism including a driving member and a pair of driven members, the combination of a clutch interposed between two of said members, said clutch comprising a pair of elements having coacting parts adapted to be placed into and out of driving relation to each other, and a pair of coacting friction elements arranged to normally hold one of said clutch elements in driving relation to one of said two members, one of said friction elements being fixed to rotate with said one clutch element, the other of said friction elements being fixed to rotate with said one member, said friction elements being adapted to yield to permit a relative movement of said two members when the load on said clutch exceeds a predetermined amount.

6. In a differential gear mechanism including a driving member and a pair of driven members, the combination of a clutch interposed between two of said members, said clutch comprising a pair of elements having coacting parts adapted to be placed into and out of driving relation to each other, a pair of coacting friction elements interposed between one of said clutch elements and one of said two members for normally holding them in driving relation to each other, said friction elements being adapted to yield to permit a relative movement of said two members when the load on said clutch exceeds a predetermined amount, and means for varying the pressure between said friction elements.

7. In a differential gear mechanism including a driving member and a pair of driven members, the combination of a clutch interposed between two of said members, said clutch comprising a pair of elements having coacting parts adapted to be placed into and out of driving relation to each other, a pair of friction discs concentrically arranged on one of said two members, one of said disks being fixed to rotate with one of said clutch elements, the other of said disks being fixed to rotate with said one member, said disks coacting with each other to normally hold said one member in driving relation to said one clutch element and being adapted to yield to permit a relative movement of said two members when the load on said clutch exceeds a predetermined amount, and means for adjusting one of said disks axially with respect to the other disk for varying the friction between the opposed faces of said disks.

8. In a differential gear mechanism including a driving member and a pair of driven members, the combination of a clutch interposed between two of said members, said clutch comprising a pair of coacting elements, one of said elements being loosely mounted on one of said two members and being movable into and out of driving relation with the other of said clutch elements, a sleeve splined on said one clutch element, and a friction element interposed between said sleeve and said one member for normally holding them in driving relation to each other, said friction element being arranged to permit a relative movement of said two members when the load on said clutch exceeds a predetermined amount.

9. In a differential gear mechanism including a driving member and a pair of driven members, the combination of a clutch interposed between two of said members, said clutch comprising a pair of coacting elements, one of said elements being loosely mounted on one of said two members, and being movable into and out of driving relation with the other of said clutch elements, a sleeve splined on said one clutch element, and a pair of friction disks concentrically arranged on said one member, one of said disks being splined to said one member, the other of said disks being splined to said sleeve, said disks coacting with each other to normally hold said one member in driving relation to said one clutch element and being adapted to yield to permit a relative movement of said two members when the load on said clutch exceeds a predetermined amount.

10. In a differential gear mechanism including a driving member and a pair of driven members, the combination of a clutch interposed between two of said members, said clutch comprising a pair of coacting elements, one of said elements being loosely mounted on one of said two members and being movable into and out of driving relation with the other of said clutch elements, a sleeve splined on said one clutch element, a pair of friction disks concentrically arranged on said one member, one of said disks being splined to said one member, the other of said disks being splined to said sleeve, said disks coacting with each other to normally hold said one member in driving relation to said one clutch element and being adapted to yield to permit a relative movement of said two members when the load on said clutch exceeds a predetermined amount, and means for axially adjusting one of said disks relative to the other for varying the friction between said disks.

11. In a differential gear mechanism including a driving member and a pair of driven members, the combination of a clutch interposed between two of said members, said clutch comprising a pair of coacting elements, one of said elements being loosely mounted on one of said two members and being movable into and out of driving relation with the other of said clutch elements, a sleeve splined on said one clutch element and projecting beyond one end thereof, a pair of friction disks concentrically arranged within the projecting part of said sleeve, one of said disks being splined to said sleeve, the other disk being splined to said one member, said disks coacting with each other to normally hold said one member in driving relation to said one clutch element and being adapted to yield to permit a relative movement of said two members when the load on said clutch exceeds a predetermined amount, a bearing member loosely mounted in said sleeve and located between said one clutch element and said disks, and a clamp adjustably mounted in said sleeve for holding said disks in frictional contact with each other.

Signed at Syracuse, N. Y., this 16th day of Feb., 1923.

IRVING C. WOODWARD.